US007908236B2

(12) United States Patent
Modha et al.

(10) Patent No.: US 7,908,236 B2
(45) Date of Patent: Mar. 15, 2011

(54) USING MULTIPLE DATA STRUCTURES TO MANAGE DATA IN CACHE

(75) Inventors: Dharmendra Shantilal Modha, San Jose, CA (US); Binny Sher Gill, Auburn, MA (US); Michael Thomas Benhase, Tucson, AZ (US); Joseph Smith Hyde, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 11/459,004

(22) Filed: Jul. 20, 2006

(65) Prior Publication Data

US 2008/0021853 A1 Jan. 24, 2008

(51) Int. Cl.
*G06F 15/00* (2006.01)
*G06F 17/00* (2006.01)
*G06N 3/10* (2006.01)

(52) U.S. Cl. ........................................................ 706/44
(58) Field of Classification Search .................. 711/210, 711/133; 706/44
See application file for complete search history.

(56) References Cited

U.S. PATENT DOCUMENTS

| | | | |
|---|---|---|---|
| 4,636,946 A | 1/1987 | Hartung et al. | |
| 5,778,442 A | 7/1998 | Ezzat et al. | |
| 6,078,995 A | 6/2000 | Bewick et al. | |
| 6,141,731 A | 10/2000 | Beardsley et al. | |
| 6,393,525 B1 | 5/2002 | Wilkerson et al. | |
| 6,751,700 B2 * | 6/2004 | Donoghue et al. | 711/3 |
| 6,785,771 B2 * | 8/2004 | Ash et al. | 711/136 |
| 2003/0149843 A1 * | 8/2003 | Jarvis et al. | 711/133 |
| 2005/0086437 A1 * | 4/2005 | Modha | 711/133 |
| 2005/0267878 A1 * | 12/2005 | Mogi et al. | 707/3 |
| 2005/0273545 A1 * | 12/2005 | Denneau et al. | 711/3 |

OTHER PUBLICATIONS

'Informed prefecthing and caching': Patterson, 1995, ACM, sigpops, 0-89791-715-4, pp. 79-95.*
Cited prior art from China Patent Office re IBM dated Jan. 9, 2009.

* cited by examiner

*Primary Examiner* — Michael B. Holmes
*Assistant Examiner* — Peter Coughlan
(74) *Attorney, Agent, or Firm* — David W. Victor; Konrad Raynes & Victor LLP

(57) ABSTRACT

Provided are a method, system and program for using multiple data structures to manage data in cache. A plurality of data structures each have entries identifying data from a first computer readable medium added to a second computer readable medium. A request is received for data in the first computer readable medium. A determination is made as to whether there is an entry for the requested data in one of the data structures. The requested data is retrieved from the first computer readable medium to store in the second computer readable medium in response to determining that there is no entry for the requested data in one of the data structures. One of the data structures is selected in response to determining that there is no entry for the requested data in one of the data structures and an entry for the retrieved data is added to the selected data structure.

35 Claims, 5 Drawing Sheets

Cache Index Entry

Cache Index Entry

USING MULTIPLE DATA STRUCTURES TO MANAGE DATA IN CACHE

BACKGROUND OF THE INVENTION

1. Field of the Invention

The present invention relates to a method, system, and program using multiple data structures to manage data in cache.

2. Description of the Related Art

A cache management system stores data maintained in storage device in a faster access media, such as a memory device, so that requests for the data from the storage can be serviced faster from the faster access cache memory. A cache management system may maintain a linked list having one entry for each data unit staged into cache from the storage. In the commonly used Least Recently Used (LRU) cache technique, if data in the cache is accessed, i.e., a cache "hit", then the entry in the LRU list for the accessed data is moved to a Most Recently Used (MRU) end of the list. If the requested data is not in the cache, i.e., a cache miss, then the data in the cache whose entry is at the LRU end of the list may be removed (or destaged back to storage) and an entry for the new data staged into cache is added to the MRU end of the LRU list. With this LRU cache technique, data that is more frequently accessed is likely to remain in cache, while data less frequently accessed will more likely be removed from the LRU end of the list to make room in cache for newly accessed data.

In an asynchronous computing environment where multiple threads or different processors in a multi-processor environment are accessing data from the same cache, the MRU entry is protected by a lock to serialize access to the MRU entry. This means that one or more threads must wait for the thread holding the lock on the MRU entry to complete their cache hit or miss operation. In multi-threaded environments there is a significant amount of contention for this lock because all cache hits and cache misses require access to this lock. Such contention is considered undesirable for high performance and high throughput environments such as virtual memory, databases, file systems, and storage controllers.

FIG. 1 illustrates a clock data structure (or "clock") 2 known in the prior art to manage data cached from a storage device. The clock 2 comprises a circular buffer. The clock includes a clock hand 4 that points between a head entry 6 and tail entry 8 of the clock 2. Data from storage is added to the head entry 6. The clock algorithm maintains a "page reference bit" for each clock 2 entry, or page. When data is first brought into the cache from storage, the page reference bit for the entry for that cached data is set to zero. When data in cache is accessed, the page reference bit for the accessed data is set to one.

To replace data in cache with newly accessed data from storage, if the head entry 8 at the clock hand 4 has a page reference bit of zero, then the data corresponding to the head entry 8 is destaged from cache, and information on the new page is added to the head entry 6. If the page reference bit for the current head entry 8 is one, then that page reference bit is reset to zero and the clock hand 4 moves forward through the clock 2 until finding a head entry 8 having a page reference bit of zero to replace. In virtual memory applications, the page reference bit can be changed by the hardware.

One advantage of the clock cache technique is that there is no need to move a page to an MRU position for a cache hit such as the case with the LRU cache technique, which requires a lock and serialization to move the entry in the LRU list for accessed data to the MRU position. Furthermore, the hit ratio of the clock cache technique is usually comparable to that of the LRU cache method. For this reason, variants of the clock cache technique are used in many operating systems and application programs. However, a lock is still required for a cache miss when adding a page to the head entry 8 of the clock structure. Thus, both the LRU and clock cache techniques require lock contention when replacing data in cache.

For these reasons, there is a need in the art to provide techniques for managing data in a cache.

SUMMARY

Provided are a method, system and program for using multiple data structures to manage data in cache. A plurality of data structures each have entries identifying data from a first computer readable medium added to a second computer readable medium. A request is received for data in the first computer readable medium. A determination is made as to whether there is an entry for the requested data in one of the data structures. The requested data is retrieved from the first computer readable medium to store in the second computer readable medium in response to determining that there is no entry for the requested data in one of the data structures. One of the data structures is selected in response to determining that there is no entry for the requested data in one of the data structures and an entry for the retrieved data is added to the selected data structure.

In a further embodiment, selecting one of the data structures comprises randomly selecting one of the data structures.

In a further embodiment, a determination is made as whether the second computer readable medium has available space to store the retrieved requested data in response to determining that there is no entry for the requested data in one of the data structures. One entry is selected from one of the data structures in response to determining that the second computer readable medium does not have available space. The data for the selected entry is destaged from the second computer readable medium.

In a further embodiment, selecting one entry from one of the data structures in response to determining that the second computer readable medium does not have available space comprises determining one of the data structures having an oldest entry, wherein the selected entry comprises the oldest entry in the determined data structure.

In a further embodiment, selecting one entry from one of the data structures in response to determining that the second computer readable medium does not have available space comprises selecting a random subset of the data structures and selecting one data structure from the selected random subset whose oldest entry is no more recent than an oldest entry in any other data structure in the selected subset.

In a further embodiment, the data structures comprise Least Recently Used (LRU) lists and wherein adding the entry for the retrieved data comprises adding the entry to a Most Recently Used (MRU) end of the selected LRU list.

In a further embodiment, the data structures comprise clocks, wherein each clock has a head and tail entries adjacent to each other in the list, and wherein adding the entry for the retrieved data comprises adding the entry to the head entry of the selected clock.

In a further embodiment, the entries in the clocks indicate whether the entry has been accessed. A determination is made as to whether the second computer readable medium has available space to store the retrieved requested data in response to determining that there is no entry for the requested data in one of the clocks. One of the clocks is selected and a determination is made of one entry in the clock that is indicated as having not been accessed. The data for the determined entry is destaged from the second computer readable medium.

In a further embodiment, a plurality of data structures each have entries identifying data from a first computer readable medium added to a second computer readable medium. A request is received for data in the first computer readable medium and a determination is made as to whether there is an entry for the requested data in one of the data structures. The requested data is accessed from the second computer readable medium for the data request in response to determining that there is one entry for the requested data in one of the data structures. One of the data structures is selected in response to determining that there is one entry for the requested data in one of the data structures and the determined entry for the requested data is moved to the data structure selected in response to determining that there is one entry for the requested data.

In a further embodiment, the data structure is selected randomly in response to determining that there is one entry for the requested data in one of the data structures.

In a further embodiment, each data structure is a member of a set of data structure comprising one of: Least Recently Used (LRU) lists and clock data structures.

DETAILED DESCRIPTION

Figure 1:
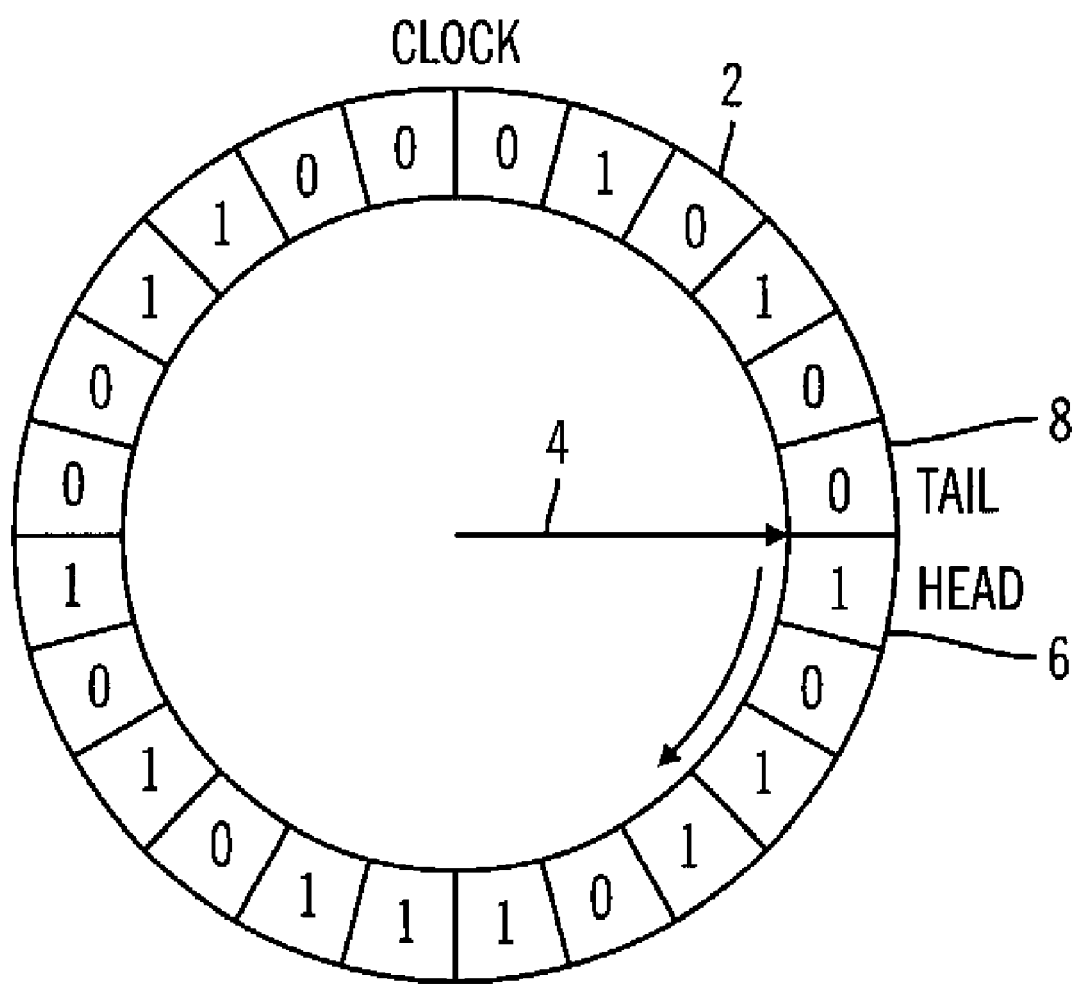
FIG. 1 illustrates a prior art clock data structure used for cache management.
Figure 2:
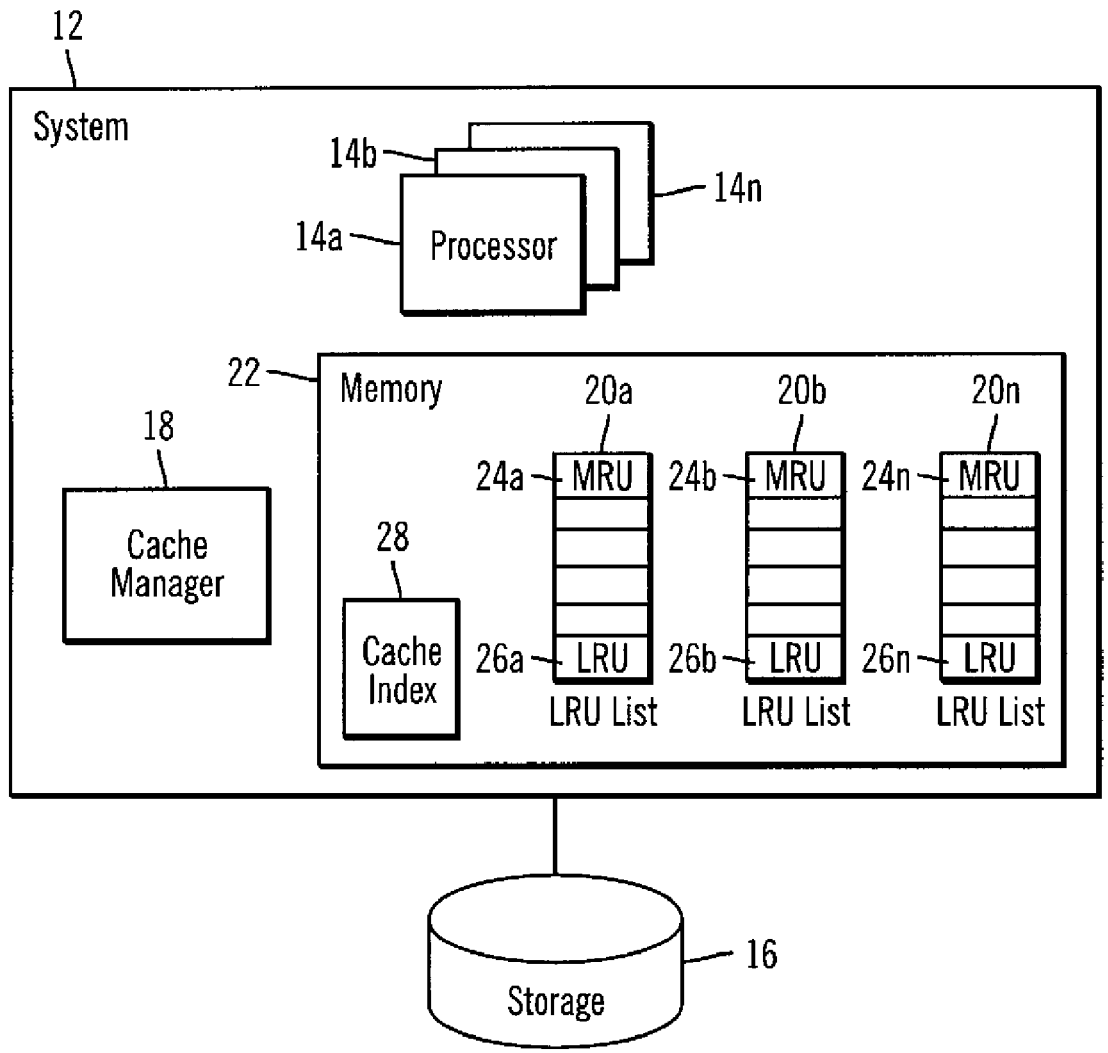
FIG. 2 illustrates an embodiment of a computing environment.

FIG. 2 illustrates an embodiment of a computing environment. A system 12 includes one or more processors 14a, 14b . . . 14n, where each processor 14a, 14b . . . 14n submits Input/Output (I/O) requests directed to storage locations in a storage 16. A cache manager 18 handles the I/O requests and caches data requested by the processors 14a, 14b . . . 14n in one of multiple Least Recently Used (LRU) lists 20a, 20b . . . 20n stored in a memory 22. The cache manager 18 uses the LRU lists 20a, 20b . . . 20n to manage data from the storage 16 cached in the memory 22 to determine when to stage and destage data form the storage 16 to optimize cache hits and minimize cache misses. Each LRU list 20a, 20b . . . 20n includes a Most Recently Used (MRU) end 24a, 24b . . . 24n and LRU end 26a, 26b . . . 26n. Data accessed from the storage 16 identified in the LRU lists 20a, 20b . . . 20n is cached in the memory 22.

The cache manager 18 further maintains a cache index 28 that has information on data from the storage 6 maintained in the cache of the memory 22. The cache index 28 indicates whether data from a particular address or location in the storage 16 is identified in an entry in one of the LRU lists 20a, 20b . . . 20n. A storage address or location may comprise a track, block, page, or any other segment of data in the storage 16.

The storage 16 may comprise one or more storage devices, such as one or more disk drives, an array of storage devices, such as a Just a Bunch of Disks (JBOD), Direct Access Storage Device (DASD), Redundant Array of Independent Disks (RAID) array, virtualization device, tape storage, flash memory, etc. The memory 22 may comprise one or more memory devices that has higher throughput and faster access than the storage 16. In alternative embodiments, the memory 22 and storage 16 may comprise any suitable computer readable media known in the art, such that one computer readable medium functions as a fast access cache to another computer readable medium to which the I/O requests are directed. The processors 14a, 14b . . . 14n may comprise separate microprocessor devices or separate processing cores implemented on one or more multi-core microprocessor devices. The cache manager 18 may be implemented as a computer program executed by one or more of the processors 14a, 14b . . . 14n or implemented in the memory 22 hardware.

In one embodiment, the system 12 may comprise a storage controller receiving read and write requests to the storage 16 from multiple connected hosts.

Figure 3:
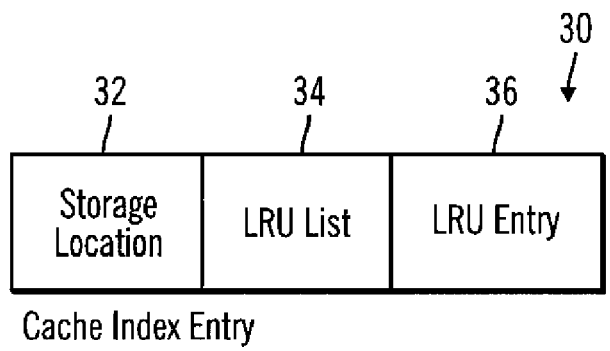
FIG. 3 illustrates an embodiment of an index entry used to manage cache in the computing environment of FIG. 2.

FIG. 3 illustrates an embodiment of a cache index entry 30 in the cache index 28, which indicates a storage location 32, such as a storage address; an LRU list 34 identifying the LRU list 10a, 10b . . . 10n having the entry for the cached storage location 32; and the entry 36 position in the indicated LRU list 34 for the cached storage location 32.

The cache index 28 may comprise a hash table whose entries are indexed based on a hash of the storage location 32. Alternatively, the cache index 28 may be implemented in suitable index type data structures other than a hash table known in the art.

Figure 4:
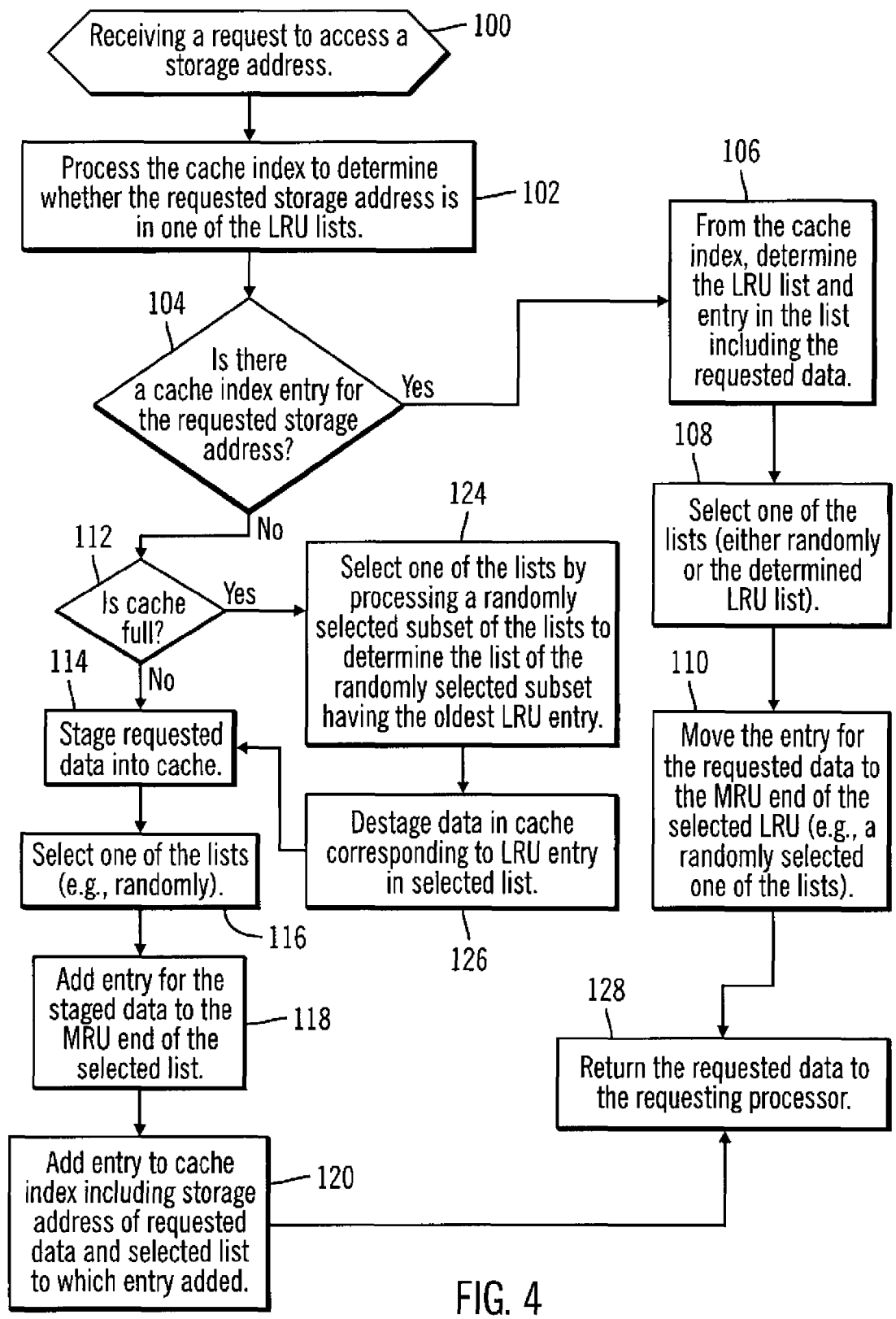
FIG. 4 illustrates an embodiment of operations to manage cache using the data structures of FIGS. 2 and 3.

FIG. 4 illustrates an embodiment of operations performed by the cache manager 18 to manage the caching of data from the storage 16 in the memory 22. Upon receiving (at block 100) a request, e.g., read or write request, to access data in the storage 16, the cache manager 18 processes (at block 102) the cache index 28 to determine whether the requested storage address is in one of the LRU lists 20a, 20b . . . 20n. The storage location of data that is cached may comprise a block, track, page or other unit or segment of storage. If (at block 104) there is a cache index entry 30 (FIG. 3) for the requested storage address, then the requested data is in cache, i.e., a "cache hit". In such case, the cache manager 18 determines (at block 106) from the cache index 28 the LRU list 20a, 20b . . . 20n from field 34 and entry 36 in the list for the requested data. In one embodiment, the cache manager 18 may move the entry for the accessed data to the MRU end 24a, 24b . . . 24n of the current LRU list 20a, 20b . . . 20n in which the entry is included. In alternative embodiment, the cache manager 18 may select (at block 108), e.g., randomly select, one of the LRU lists 20a, 20b . . . 20n (which may or may not include the LRU list already including the determined entry) and move (at block 110) the determined entry for the requested data to the MRU end 24a, 24b . . . 24n of the selected LRU list 20a, 20b . . . 20n.

If (at block 104) there is no entry in the cache index 28 for the requested storage address, then the requested data is not in cache, i.e., a "cache miss". In such case, if (at block 112) the cache memory 22 is not full, i.e., has space available for the requested data, then the cache manager 18 stages (at block 114) the requested data into the cache memory 22. To create an LRU list entry for the data staged into the cache memory 22, the cache manager 18 selects, e.g., randomly, (at block 116) one of the LRU lists 20a, 20b . . . 20n and adds (at block 118) the entry for the staged data to the MRU end 24a, 24b . . . 24n of the selected LRU list 20a, 20b . . . 20n. An entry 30 (FIG. 3) is also added (at block 120) to the cache index 28 including the storage address of the requested data and selected LRU list 20a, 20b . . . 20n to which the entry 30 is added. If (at block 112) the cache is full, i.e., does not have space available for the requested data, then data needs to be destaged. To destage data, the cache manager 18 selects (at block 124) one of the lists by processing a randomly selected subset of the lists to determine the list of the randomly selected subset having the oldest LRU 26a, 26b . . . 26n entry. The oldest entry can be determined by maintaining with each cache entry a timestamp that stores the time of last access for that entry. For instance, if there are n LRU lists, then the subset of randomly selected lists may comprise m lists. In one embodiment, the subset of lists, or m, may be two. The cache manager 18 then destages (at block 126) the data for the LRU entry 26a . . . 26n from the selected LRU list 20a, 20b . . . 20n. Destaging the data removes the data from the memory 22 and applies any updates to the data to the storage 16. After destaging the data, control proceeds to block 114, to stage in the requested data. From block 110 or 120, control proceeds to block 128 to return the requested data to the requesting processor 14a, 14b . . . 14n.

By randomly distributing entries among LRU lists, the described embodiments seek to increase the likelihood that concurrently accessed storage locations have entries in different LRU lists to avoid lock contention by the processors 14a, 14b . . . 14n requesting the data. For instance, if there are two concurrent requests to storage locations whose LRU entries are on different LRU lists, then there would be no delays due to lock contention and serialization that result when two requests require access to the MRU entry in the same LRU list. However, lock contention may still occur if two concurrent requests are for data whose entries are on the same list. Nonetheless, the described embodiments substantially reduce the likelihood of lock contention by randomly distributing most recently accessed entries across multiple LRU lists having separate locks for their MRU and LRU ends.

Figure 5:
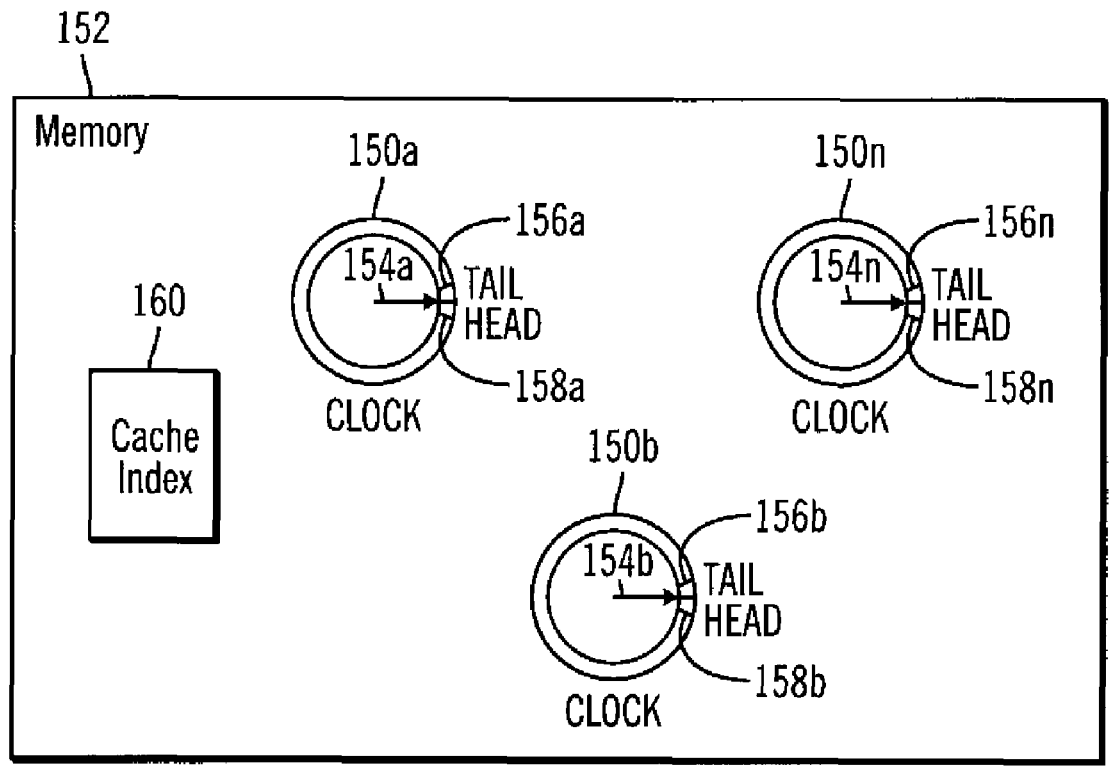
FIG. 5 illustrates an embodiment of components in a memory used to manage a cache.

FIG. 5 is an alternative embodiment, where instead of using LRU lists 20a, 20b . . . 20n (FIG. 2), the cache manager 18 maintains clock data structures (or "clocks") 150a, 150b . . . 150n in memory 152 to manage data from the storage 16 in the cache memory 152. Each clock 150a, 150b . . . 150n includes a clock hand 154a, 154b . . . 154n providing a pointer to a location in the clock 150a, 150b . . . 150n between a tail entry 156a, 156b . . . 156n and ahead entry 158a, 158b . . . 158n of the clock 150a, 150b . . . 150n. A cache index 160 provides an index of storage addresses to entries in one of the clocks. The cache index 160 may comprise a hash table or other suitable index data structure.

Figure 6:
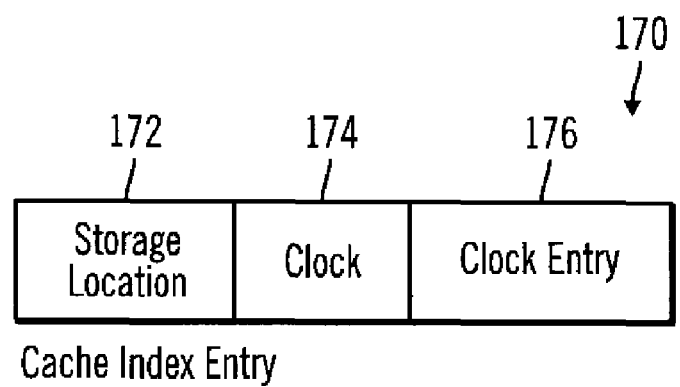
FIG. 6 illustrates an embodiment of an index entry used to manage cache with the memory of FIG. 5.

FIG. 6 is an embodiment of an entry 170 in the cache index 160, which indicates a storage location 172, such as a storage address; a clock 174 identifying the clock 150a, 150b . . . 150n having an entry for the storage location 172; and the entry 176 in the indicated clock 174 for the storage location 172.

Figure 7:
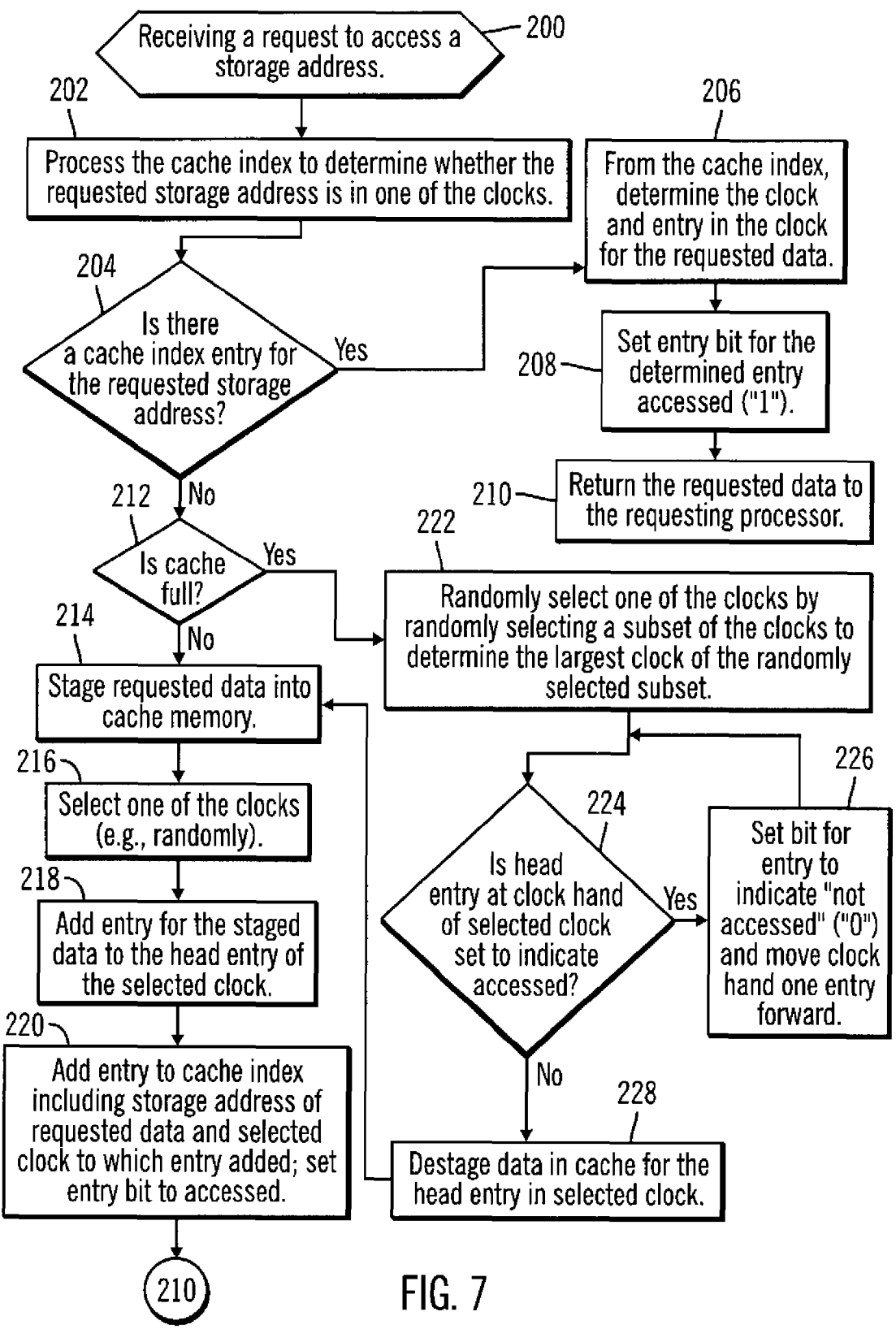
FIG. 7 illustrates an embodiment of operations to manage cache using the data structures of FIGS. 5 and 6

FIG. 7 illustrates an embodiment of operations performed by the cache manager 18 using clocks 150a, 150b . . . 150n to manage the cache memory 152. Upon receiving a request (at block 200) for a storage address, the cache manager 18 processes (at block 202) the cache index 160 to determine whether the requested data is in one of the clocks 150a, 150b . . . 150n. If (at block 204) there is a cache index entry 160 for the requested storage address, i.e., a "cache hit", then the cache manager 18 determines (at block 206) from the cache index 160 the clock 150a, 150b . . . 150n and entry 176 (FIG. 6) in the clock 150a, 150b . . . 150n for the requested data. The cache manager 18 then sets (at block 208) the entry bit for the determined entry to indicate the entry has been accessed (e.g., setting the page reference bit to "1") and returns (at block 210) the requested data. If (at block 204) the cache index 160 does not include an entry for the requested storage address, i.e., a "cache miss", and if (at block 212) the cache memory 152 is not full, i.e., does have space available for the requested data, then the cache manager 18 stages (at block 214) the requested data into the cache memory 152 and selects (at block 216) one of the clocks 150a, 150b . . . 150n, which may be selected randomly. An entry 170 (FIG. 6) for the staged data is added (at block 218) to the head entry 158a, 158b . . . 158n of the selected clock 150a, 150b . . . 150n and an entry is added (at block 220) to the cache index 170. This cache index entry 170 includes the storage address 172 of the requested data, the selected clock 174 and the entry in the selected clock for the data staged into the memory 152. From block 220, control proceeds to block 210 to return the data.

If (at block 212) the memory cache 152 is full, i.e., does not have space available for the requested data, then the cache manager 18 may select (at block 222) one of the clocks 150a, 150b . . . 150n by randomly selecting a subset of the clocks 150a, 150b . . . 150n to determine the largest clock, i.e., clock with the most entries 170, of the randomly selected subset from which to remove an entry, which is the clock having the most entries. For each clock, a counter indicating the number of entries in it is maintained. The counter can be used to determine the largest clock, i.e., the one containing the most entries, amongst a set of clocks. Alternatively, the cache manager 18 may randomly select one of the clocks 150a, 150b . . . 150n to be updated with the entry for the data being staged into the memory 152 for the cache miss.

If (at block 224) the head entry 158a, 158b . . . 158n at the clock hand 154a, 154b . . . 154n of the selected clock set 150a, 150b . . . 150n is indicated as having been accessed, i.e., the page reference bit for that entry is set to "1", then the cache manager 18 sets (at block 226) the bit for the entry 170 to indicate that the storage address has not been accessed, e.g., "0", and moves the clock hand 154a, 154b . . . 154n one entry forward so that the previous head entry 158a, 158b . . . 158n is now the tail entry 156a, 156b . . . 156n of the new clock hand position. After resetting the bit for the entry to indicate "not accessed", e.g., "0", (at block 226) control proceeds back to block 224 so that the clock hand 154a, 54b . . . 154n continues moving forward until reaching a head entry 158a, 158b . . . 158n whose access bit indicates the entry has not been accessed recently, e.g., the page reference bit is zero.

If (at block 224) the head entry 158a, 158b . . . 158n at the clock hand 154a, 154b . . . 154n indicates the storage address in cache has not been accessed, e.g., the page reference bit is zero, then the cache manager 18 destages (at block 228) the data for the head entry 156a, 156b . . . 156n from the cache memory 152 to storage 16 if the data has been modified. If the data has not been modified, the data may be discarded. Control then proceeds to block 214 to stage in the requested data, add an entry for the requested data to one of the clocks 150a, 150b . . . 150n, and return the requested data.

By randomly distributing entries among clock data structures, the described embodiments seek to increase the likelihood that concurrently accessed storage locations have entries in different clocks to avoid lock contention by the processors 14a, 14b . . . 14n when there are cache misses. For instance, if there are two concurrent requests to storage locations whose clock entries are on different clocks, then there would be no delays due to lock contention and serialization if there is a cache miss because different clocks may be separately updated for the data staged into cache for the cache miss. The described embodiments substantially reduce the likelihood of lock contention by randomly distributing most recently accessed entries across multiple clocks having separate locks. Moreover, using multiple lists improves the system transfer throughput by avoiding locking delays.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the data structures used to store the entries for the data in the cache comprised LRU lists or clocks. In alternative embodiments, additional suitable data structures may be used to store entries of information to manage the data in the cache. Moreover, in the described embodiments, the data structures used to store the entries were of the same type, e.g., LRU lists, clocks. In an alternative embodiment, the multiple data structures used to store the cache entries may be of mixed types.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing a plurality of data structures each having entries identifying data from a first computer readable medium added to a second computer readable medium;
receiving requests for data in the first computer readable medium;
for each of the requests for the data, performing:
determining whether there is an entry for the requested data in one of the data structures;
retrieving the requested data from the first computer readable medium to store in the second computer readable medium in response to determining that there is no entry for the requested data in one of the data structures;
selecting one of the data structures in response to determining that there is no entry for the requested data in one of the data structures, wherein different data structures are selected for different of the requests; and
adding an entry for the retrieved data to the selected data structure, wherein the entries for the retrieved data for the different read requests are added to the selected different data structures.

2. The method of claim 1, wherein selecting one of the data structures comprises randomly selecting one of the data structures.

3. The method of claim 1, further comprising:
determining whether the second computer readable medium has available space to store the retrieved requested data in response to determining that there is no entry for the requested data in one of the data structures;
selecting one entry from one of the data structures in response to determining that the second computer readable medium does not have available space;
destaging the data for the selected entry from the second computer readable medium.

4. The method of claim 3, wherein selecting one entry from one of the data structures in response to determining that the second computer readable medium does not have available space comprises:
determining one of the data structures having an oldest entry, wherein the selected entry comprises the oldest entry in the determined data structure.

5. The method of claim 3, wherein selecting one entry from one of the data structures in response to determining that the second computer readable medium does not have available space comprises:
selecting a random subset of the data structures; and
selecting one data structure from the selected random subset whose oldest entry is no more recent than an oldest entry in any other data structure in the selected subset.

6. The method of claim 1, wherein the data structures comprise Least Recently Used (LRU) lists and wherein adding the entry for the retrieved data comprises adding the entry to a Most Recently Used (MRU) end of the selected LRU list.

7. The method of claim 1, wherein the data structures comprise clocks, wherein each clock has a head and tail entries adjacent to each other in the list, and wherein adding the entry for the retrieved data comprises adding the entry to the head entry of the selected clock.

8. The method of claim 7, wherein the entries in the clocks indicate whether the entry has been accessed, further comprising:
determining whether the second computer readable medium has available space to store the retrieved requested data in response to determining that there is no entry for the requested data in one of the clocks;
selecting one of the clocks;
determining one entry in the clock that is indicated as having not been accessed; and
destaging the data for the determined entry from the second computer readable medium.

9. The method of claim 1, further comprising:
providing a cache index indicating whether data for a storage location in the second computer readable medium is identified in one entry in one of the data structures, wherein the determining of whether there is an entry for the requested data comprises determining from the cache index whether there is the entry for the requested data, wherein the cache index indicates the entries for the retrieved data stored in the second computer readable medium in different of the selected data structures.

10. A method, comprising:
providing a plurality of data structures each having entries identifying data from a first computer readable medium added to a second computer readable medium;
receiving requests for data in the first computer readable medium;
for each of the received requests, performing:
determining whether there is an entry for the requested data in one of the data structures;
accessing the requested data from the second computer readable medium for the data request in response to determining that there is one entry for the requested data in one of the data structures;
selecting one of the data structures in response to determining that there is one entry for the requested data in one of the data structures, wherein different data structures are selected for different of the requests; and
moving the determined entry for the requested data to the data structure selected in response to determining that there is one entry for the requested data, wherein the entries for the requested data for the different requests are moved to the selected different data structures.

11. The method of claim 10, wherein the data structure is selected randomly in response to determining that there is one entry for the requested data in one of the data structures.

12. The method of claim 10, wherein each data structure is a member of a set of data structures comprising one of: Least Recently Used (LRU) lists and clock data structures.

13. The method of claim 10, further comprising:
providing a cache index indicating whether data for a storage location in the second computer readable medium is identified in one entry in one of the data structures, wherein the determining of whether there is an entry for the requested data comprises determining from the cache index whether there is the entry for the requested data, wherein the cache index indicates the entries for the requested data stored in the second computer readable medium in different of the selected data structures.

14. A system in communication with a first computer readable medium, comprising:
at least one processor;
a second computer readable medium;
a plurality of data structures each having entries identifying data from the first computer readable medium added to the second computer readable medium;
a cache manager managing access to the second computer readable medium enabled to perform operations, the operations comprising:

providing a plurality of data structures each having entries identifying data from the first computer readable medium added to the second computer readable medium;

receiving requests for data in the first computer readable medium from one processor;

for each of the requests for the data, performing:
determining whether there is an entry for the requested data in one of the data structures;
retrieving the requested data from the first computer readable medium to store in the second computer readable medium in response to determining that there is no entry for the requested data in one of the data structures;
selecting one of the data structures in response to determining that there is no entry for the requested data in one of the data structures, wherein different data structures are selected for different of the requests; and
adding an entry for the retrieved data to the selected data structure, wherein the entries for the retrieved data for the different read requests are added to the selected different data structures.

15. The system of claim 14, wherein the operations performed by the cache manager further comprise:
determining whether the second computer readable medium has available space to store the retrieved requested data in response to determining that there is no entry for the requested data in one of the data structures;
selecting one entry from one of the data structures in response to determining that the second computer readable medium does not have available space;
destaging the data for the selected entry from the second computer readable medium.

16. The system of claim 15, wherein selecting one entry from one of the data structures in response to determining that the second computer readable medium does not have available space comprises:
selecting a random subset of the data structures; and
selecting one data structure from the selected random subset whose oldest entry is no more recent than an oldest entry in any other data structure in the selected subset.

17. The system of claim 14, wherein the data structures comprise Least Recently Used (LRU) lists and wherein adding the entry for the retrieved data comprises adding the entry to a Most Recently Used (MRU) end of the selected LRU list.

18. The system of claim 14, wherein the data structures comprise clocks, wherein each clock has a head and tail entries adjacent to each other in the list, and wherein adding the entry for the retrieved data comprises adding the entry to the head entry of the selected clock.

19. The system of claim 18, wherein the entries in the clocks indicate whether the entry has been accessed, and wherein the operations performed by the cache manager further comprise:
determining whether the second computer readable medium has available space to store the retrieved requested data in response to determining that there is no entry for the requested data in one of the clocks;
selecting one of the clocks;
determining one entry in the clock that is indicated as having not been accessed; and
destaging the data for the determined entry from the second computer readable medium.

20. The system of claim 14, wherein the operations further comprise:
providing a cache index indicating whether data for a storage location in the second computer readable medium is identified in one entry in one of the data structures, wherein the determining of whether there is an entry for the requested data comprises determining from the cache index whether there is the entry for the requested data, wherein the cache index indicates the entries for the retrieved data stored in the second computer readable medium in different of the selected data structures.

21. A system in communication with a first computer readable medium, comprising:
a processor;
a second computer readable medium;
a plurality of data structures each having entries identifying data from the first computer readable medium added to the second computer readable medium;
a cache manager managing access to the second computer readable medium enabled to perform operations comprising:
receiving requests for data in the first computer readable medium from the processor;
for each of the requests for the data, performing:
determining whether there is an entry for the requested data in one of the data structures;
accessing the requested data from the second computer readable medium for the data request in response to determining that there is one entry for the requested data in one of the data structures;
selecting one of the data structures in response to determining that there is one entry for the requested data in one of the data structures, wherein different data structures are selected for different of the requests; and
moving the determined entry for the requested data to the data structure selected in response to determining that there is one entry for the requested data, wherein the entries for the requested data for the different requests are moved to the selected different data structures.

22. The system of claim 21, wherein the operations further comprise:
providing a cache index indicating whether data for a storage location in the second computer readable medium is identified in one entry in one of the data structures, wherein the determining of whether there is an entry for the requested data comprises determining from the cache index whether there is the entry for the requested data, wherein the cache index indicates the entries for the requested data stored in the second computer readable medium in different of the selected data structures.

23. An article of manufacture comprising a computer readable storage medium implementing code, wherein the code causes operations to be performed to access a first computer readable medium and a second computer readable medium and operations comprising:
providing a plurality of data structures each having entries identifying data from the first computer readable medium added to the second computer readable medium;
receiving requests for data in the first computer readable medium;
for each of the requests for the data, performing:
determining whether there is an entry for the requested data in one of the data structures;

retrieving the requested data from the first computer readable medium to store in the second computer readable medium in response to determining that there is no entry for the requested data in one of the data structures;

selecting one of the data structures in response to determining that there is no entry for the requested data in one of the data structures, wherein different data structures are selected for different of the requests; and adding an entry for the retrieved data to the selected data structure, wherein the entries for the retrieved data for the different read requests are added to the selected different data structures.

24. The article of manufacture of claim 23, wherein selecting one of the data structures comprises randomly selecting one of the data structures.

25. The article of manufacture of claim 23, wherein the operations further comprise:
determining whether the second computer readable medium has available space to store the retrieved requested data in response to determining that there is no entry for the requested data in one of the data structures;
selecting one entry from one of the data structures in response to determining that the second computer readable medium does not have available space;
destaging the data for the selected entry from the second computer readable medium.

26. The article of manufacture of claim 25, wherein selecting one entry from one of the data structures in response to determining that the second computer readable medium does not have available space comprises:
determining one of the data structures having an oldest entry, wherein the selected entry comprises the oldest entry in the determined data structure.

27. The article of manufacture of claim 25, wherein selecting one entry from one of the data structures in response to determining that the second computer readable medium does not have available space comprises:
selecting a random subset of the data structures; and
selecting one data structure from the selected random subset whose oldest entry is no more recent than an oldest entry in any other data structure in the selected subset.

28. The article of manufacture of claim 23, wherein the data structures comprise Least Recently Used (LRU) lists and wherein adding the entry for the retrieved data comprises adding the entry to a Most Recently Used (MRU) end of the selected LRU list.

29. The article of manufacture of claim 23, wherein the data structures comprise clocks, wherein each clock has a head and tail entries adjacent to each other in the list, and wherein adding the entry for the retrieved data comprises adding the entry to the head entry of the selected clock.

30. The article of manufacture of claim 29, wherein the entries in the clocks indicate whether the entry has been accessed, wherein the operations further comprise:
determining whether the second computer readable medium has available space to store the retrieved requested data in response to determining that there is no entry for the requested data in one of the clocks;
selecting one of the clocks;
determining one entry in the clock that is indicated as having not been accessed; and
destaging the data for the determined entry from the second computer readable medium.

31. The article of manufacture of claim 23, wherein the operations further comprise:
providing a cache index indicating whether data for a storage location in the second computer readable medium is identified in one entry in one of the data structures, wherein the determining of whether there is an entry for the requested data comprises determining from the cache index whether there is the entry for the requested data, wherein the cache index indicates the entries for the retrieved data stored in the second computer readable medium in different of the selected data structures.

32. An article of manufacture comprising a computer readable storage medium implementing code, wherein the code causes operations to be performed to access a first computer readable medium and a second computer readable medium and operations comprising:
providing a plurality of data structures each having entries identifying data from the first computer readable medium added to the second computer readable medium;
receiving requests for data in the first computer readable medium;
for each of the received requests, performing:
determining whether there is an entry for the requested data in one of the data structures;
accessing the requested data from the second computer readable medium for the data request in response to determining that there is one entry for the requested data in one of the data structures;
selecting one of the data structures in response to determining that there is one entry for the requested data in one of the data structures, wherein different data structures are selected for different of the requests; and
moving the determined entry for the requested data to the data structure selected in response to determining that there is one entry for the requested data, wherein the entries for the requested data for the different requests are moved to the selected different data structures.

33. The article of manufacture of claim 32, wherein the data structure is selected randomly in response to determining that there is one entry for the requested data in one of the data structures.

34. The article of manufacture of claim 32, wherein each data structure is a member of a set of data structures comprising one of: Least Recently Used (LRU) lists and clock data structures.

35. The article of manufacture of claim 32, wherein the operations further comprise:
providing a cache index indicating whether data for a storage location in the second computer readable medium is identified in one entry in one of the data structures, wherein the determining of whether there is an entry for the requested data comprises determining from the cache index whether there is the entry for the requested data, wherein the cache index indicates the entries for the requested data stored in the second computer readable medium in different of the selected data structures.

* * * * *